US012544779B2

(12) United States Patent
Van Den Heuvel et al.

(10) Patent No.: US 12,544,779 B2
(45) Date of Patent: Feb. 10, 2026

(54) DEVICE AND SYSTEM FOR DISPENSING A LIQUID FROM A CONTAINER, AND METHOD FOR ASSEMBLING A DEVICE FOR DISPENSING A LIQUID

(71) Applicant: DISPENSING TECHNOLOGIES B.V., Eindhoven (NL)

(72) Inventors: Lukas Jakob Willem Van Den Heuvel, Someren (NL); Petrus Lambertus Hurkmans, Someren (NL); Paulo Nervo, Hoogeloon (NL)

(73) Assignee: DISPENSING TECHNOLOGIES B.V., Eindhoven (NL)

( * ) Notice: Subject to any disclaimer, the term of this patent is extended or adjusted under 35 U.S.C. 154(b) by 76 days.

(21) Appl. No.: 17/927,162

(22) PCT Filed: May 31, 2021

(86) PCT No.: PCT/NL2021/050347

§ 371 (c)(1),
(2) Date: Nov. 22, 2022

(87) PCT Pub. No.: WO2021/242110

PCT Pub. Date: Dec. 2, 2021

(65) Prior Publication Data

US 2023/0211364 A1 Jul. 6, 2023

(30) Foreign Application Priority Data

May 29, 2020 (NL) ..................................... 2025710

(51) Int. Cl.
*B05B 11/10* (2023.01)

(52) U.S. Cl.
CPC ........ *B05B 11/104* (2023.01); *B05B 11/1047* (2023.01); *B05B 11/1057* (2023.01); *B05B 11/1074* (2023.01)

(58) Field of Classification Search
None
See application file for complete search history.

(56) References Cited

U.S. PATENT DOCUMENTS 4,982,900 A * 1/1991 Blake .................. B05B 11/0005 222/402
2010/0224653 A1* 9/2010 Donnette ............ B05B 11/1025 222/321.9
(Continued)

FOREIGN PATENT DOCUMENTS

EP 1132144 A1 9/2001
EP 2743503 A1 6/2014
(Continued)

OTHER PUBLICATIONS

International Search Report and Written Opinion, dated Jan. 20, 2022, for Application No. PCT/NL2021/050347 (19 pages).

*Primary Examiner* — Paul R Durand
*Assistant Examiner* — Michael J. Melaragno
(74) *Attorney, Agent, or Firm* — KDW Firm PLLC

(57) ABSTRACT

A device for dispensing a liquid from a container includes an engine having a nozzle and a pump for transferring liquid from the container to the nozzle, a trigger moveable between a first position and a second position, connected to the pump for actuating the pump when brought from the first to the second position, and connecting mean, for connecting the engine to the container. A slider with at least one restricting element is slideable between a non-restricting position, in which the trigger is moveable between the first and second position, and a restricting position, in which the at least one restricting element restricts the movement of the trigger between the first and the second position.

17 Claims, 6 Drawing Sheets

(56) References Cited

U.S. PATENT DOCUMENTS

| | | | | |
|---|---|---|---|---|
| 2017/0121653 | A1* | 5/2017 | Hoefte | C11D 3/0094 |
| 2018/0318858 | A1* | 11/2018 | Maas | B05B 11/104 |

FOREIGN PATENT DOCUMENTS

| | | | | | |
|---|---|---|---|---|---|
| JP | 6105273 | B2 | | 3/2017 | |
| WO | WO-2016110508 | A1 | * | 7/2016 | B05B 11/3056 |
| WO | WO-2017074195 | A1 | * | 5/2017 | B05B 1/04 |
| WO | 2018202645 | A1 | | 11/2018 | |
| WO | WO-2021242110 | A2 | * | 12/2021 | B05B 11/1011 |

* cited by examiner

DEVICE AND SYSTEM FOR DISPENSING A LIQUID FROM A CONTAINER, AND METHOD FOR ASSEMBLING A DEVICE FOR DISPENSING A LIQUID

This application is a national stage filing under 35 U.S.C. 371 of pending International Application No. PCT/NL2021/050347, filed May 31, 2021, which claims priority to Netherlands Patent Application No. 2025710, filed May 29, 2020, the entirety of which applications are incorporated by reference herein.

The present invention relates to a device for dispensing a liquid from a container, comprising:

an engine, comprising a nozzle and a pump for transferring liquid from the container to the nozzle;

a trigger, moveable between a first position and a second position, connected to the pump for actuating the pump when brought from the first to the second position, and connecting means, for connecting the engine to the container.

Such a device, hereinafter also referred to as a liquid dispensing device, is for instance known from WO 2013/043938 A2, from the present applicant. In order to prevent the trigger from being actuated during transport or storage of the device, the device may be provided with a trigger lock, such as disclosed in FIG. 4 of WO 2013/043938 A2. Consequently, this trigger lock prevents actuation of the pump, and thereby unintended use of the pump, when the device is transported or stored as part of a system also comprising the container connected to the device, and in particular reduces the risk of spillage of the contents of the container.

The trigger lock according to WO 2013/043938 A2 however has a number of disadvantages. This trigger lock comprises an element which is, in a locked position, secured to the dispensing device, with the trigger being in a depressed position, and which is removed altogether by pulling a ring, after which the trigger is deployed to a neutral position. It may be desired to relock the trigger after the removal of the trigger. However, the process of repositioning the trigger lock is complex. Firstly, repositioning of the trigger lock comprises the step of holding the trigger in a depressed position for some time, which may, under circumstances, involve release of liquid from the nozzle, which may be unintended. Secondly, after removal of the trigger lock to prepare the liquid dispensing device for use, the trigger springs, which are provided with a thickening at a free end thereof, are engaged in a recess in the engine with this thickening (FIG. 5). When re-engaging the trigger lock, the thickening of the spring will typically remain seated in this recess. Consequently, by repositioning the trigger lock, the spring of the trigger will be put under full tension for a long period of time, during which period the spring will lose its resilience. Furthermore, the trigger lock of WO 2013/043938 A2 has a high risk of getting lost after removal from the liquid dispensing device.

Furthermore, the thickening requires an additional string to be welded to the spring, thus complicating manufacture of the device. Moreover, in this prior art arrangement the trigger is connected to the engine only by an external cover or shroud. Since such a liquid dispensing device is typically produced and assembled at the same location, which is remote from the location of sale of the product, this requires the product as a whole to be transported and reduces the flexibility in adapting the design of the dispensing device according to customer requirements. Transport of such an assembled device is however expensive and has a high risk of damage to the device. Damage to the device, especially to the outer parts of the device which are cosmetic, is often not accepted, since these are typically required to remain impeccable.

Other well-known prior art dispensing devices are provided with a nozzle which is rotatable around its axis between a number positions, wherein the trigger has a limited range of motion in a locked position with respect to an unlocked position. Despite the presence of indicia on the nozzle, it may be hard for a user to identify whether the dispensing device is in the unlocked or locked position, and as a consequence, a user may forcefully try to actuate the trigger with the nozzle in the locked position, which may lead to damage to the dispensing device to a point in which it cannot be used properly any longer, which may lead to unnecessary wastage of resources.

Furthermore, known dispensing devices pose challenges in terms of the assembly. It is preferred to connect the trigger to the pump in a way which makes it hard to move the trigger beyond a certain range of motion. For this purpose, it may be preferred to arrange the nozzle in such a way that it protrudes such that it confines the movement of the trigger to this range. However, the position of the nozzle makes such a dispensing device hard to assemble.

The invention has for its object to provide a dispensing device, which is easier to handle, either during use and/or assembly. A further object is to alleviate or even obviate the aforementioned drawbacks of prior art dispensing devices.

In accordance with the invention, this is achieved by a device as defined above, which further comprises a slider with at least one restricting element, slideable between a non-restricting position, in which the trigger is moveable between the first and second position, and a restricting position, in which the at least one restricting element restricts the movement of the trigger between the first and the second position.

The trigger is moveable between a first and second position and connected for actuating the pump by this movement to cause the dispensing device to withdraw liquid from a container connected to the dispensing device and/or dispenses the withdrawn liquid through a nozzle. The slider, which is a part of the device which is slideable, i.e. linearly moveable, between the non-restricting position and the restricting position, allows the movement of the trigger to be restricted in a way which does no longer depend on removable parts, such as in the case of the trigger lock according to WO 2013/043938 A2. The slider may be slideable in a direction which is substantially parallel to the direction in which the trigger moves between its first and second positions, or in other words substantially parallel to a longitudinal axis of an orifice in the nozzle from which the liquid is eventually dispensed.

In the restricting position of the slider the restriction imposed by the at least one restricting element may disable the trigger from being moveable between the first and second position entirely, with the first and second position being chosen as spaced apart points in the range of motion of the trigger. In other words, the slider acts as a trigger lock. However, such a restriction may also be embodied in a less restrictive way, i.e. the slider may be configured to normally restrict the movement of the trigger as described, but may further allow for movement of the trigger under other defined circumstances.

In a typical example, the first position of the trigger may be referred to as a neutral position, i.e. a position to which the trigger will return in absence of the application of force on the trigger by a user. Similarly, the second position of the trigger may in a typical example be referred to as a depressed position, i.e. a position in which the trigger is depressed with respect to the neutral position, or preferably a position in which the trigger is completely depressed. Preferably, the trigger is spring-loaded to be urged towards the neutral position.

The liquid dispensing device according to the invention will typically dispense the liquid by creating droplets or a mist of liquid, but may also or alternatively dispense the liquid as foam.

In an embodiment, the trigger comprises at least one engaging element, extending in a direction substantially perpendicular to the direction of the movement of the trigger between the first and the second position, wherein the at least one restricting element restricts the movement of the at least one engaging element between the first and the second position with respect to the non-restricting position.

The provision of such an engaging element on the trigger provides a suitable and dedicated location on the trigger for the restricting element to act on in order to restrict the trigger in the restricting position. If the trigger moves from its first to its second position by hinging with respect to a hinge axis, the direction substantially perpendicular to the direction of movement of the trigger may also be referred to as a radial direction with respect to the hinge axis.

In an embodiment, the at least one restricting element extends in the path of the at least one engaging element between the first and second position of the trigger in the restricting position, and the at least one restricting element does not extend in this path in the non-restricting position.

In this embodiment, the restricting element and the engaging element are arranged with respect to each other such that, in the restricting position of the slider, the engaging element engages with the restricting element of the slider at a point in the range of motion of the slider, thereby at least restricting the trigger from being moved beyond the restricting element. In the non-restricting position, the restricting element is at a position in which it does not limit the trigger from moving within its range of motion, since there is no point within the range of motion of the trigger, in which the restricting element engages with the engaging element.

In an embodiment, the at least one restricting element comprises a projection.

A projection is relatively easy to produce, in comparison to other shapes, such as for instance a cavity, and therefore the restricting element preferably comprises or is a projection. If there is a plurality of restricting elements, at least two of these and even all of these may comprise or be a projection.

In an embodiment, the at least one engaging element comprises a protrusion, wherein the projection and the protrusion are configured for engaging with each other in the restricting position.

A protrusion is preferred for the engaging element for the same reason as the projection is for the restricting element. Hence, the engaging element preferably comprises or is a protrusion. If there is a plurality of engaging elements, at least two of these and even all of these may comprise or be a protrusion. It is remarked that the terms ‘protrusion’ and ‘projection’ are chosen to solely to distinguish between the respective parts. Protrusions and projections may consequently have a similar or equal appearance.

In an embodiment, the restricting element is attached to the slider at a location between the trigger and the nozzle.

Consequently, the slider, which may for instance be bound by the trigger, is more compact. Typically, this means that the restricting element engages with the engaging element from the inside out, as seen from a center of the engine.

In an embodiment, the device is provided with a first and second restricting element, and a first and second engaging element, the first restricting element and first engaging element being arranged on one side of the nozzle, and the second restricting element and second engaging element being arranged on the opposite side of the nozzle.

The provision of a first restricting element (e.g. a first projection) which restricts a first engaging element (e.g. a first protrusion) on one side of the nozzle, and a second restricting element (e.g. a second projection) which restricts a second engaging element (e.g. a second protrusion) on another, opposite side of the nozzle, contributes to a stable restriction. Furthermore, forces exerted on the trigger and the slider may be distributed more evenly.

In other words, in this embodiment, the number of restricting elements is at least two (“the first” and “the second”), as opposed to the more general definition, in which the number of restricting elements is at least one. In the same way, in this embodiment, the number of engaging elements is at least two.

In an embodiment, the slider comprises a U-shaped end, wherein the first restricting element and the second restricting element are arranged at respective free ends of the legs of the U-shaped end.

The provision of the first and second restricting elements on a U-shaped end, allows a part of the engine to be accommodated in the cavity provided by this U-shaped end, while the first and second restricting element are located around this part. Consequently, the space in the engine dedicated for receiving the slider can be smaller, contributing to a more compact design of the dispensing device. This effect is more profoundly present when the restricting element engages with the engaging element from the inside out, as seen from the center of the trigger. The part nested in the U-shaped end may for instance be the nozzle, or a part in line with the nozzle.

In an embodiment, at least one of the restricting element and the engaging element are sloping towards each other.

As mentioned before, there may be circumstances in which it is desired that the trigger is moveable between its first and second position with the slider in the restricting position, more or less as if the slider were to be in the non-restricting position. In other words, the trigger is able to override the slider in its restricting position, while keeping the slider functional after activation of such an override. Such a situation may for instance be the exertion of an operating force on the trigger by a user which is substantially above a standard operating force for a period of time, in order to prevent damage to the dispensing device which may be irreparable. For instance, the engaging element of the trigger may, solely as a consequence of the force exerted on the trigger and in absence of any direct or indirect actuation of the slider, force the slider towards its non-restricting position. The engaging element and/or the restricting element may alternatively or additionally have a resilience, which allows the engaging element to travel beyond the restricting element without substantially forcing the slider towards the non-restricting position. In either way, it is beneficial in such a case that at least one or even both of the engaging element and the restricting element facing towards said engaging element are sloping towards each other. The decreased thickness of the respective parts in a direction towards each other makes it easier for the trigger to become moveable between the first and second position with the slider being in the restricting position.

In an embodiment, the slider is adapted to allow for movement of the trigger between its first and second position in the restricting position of the slider upon the exertion of an operating force on the trigger which is substantially above a standard operating force for a period of time.

As mentioned before, it may desired that the trigger is moveable between its first and second position with the slider in the restricting position, more or less as if the slider were to be in the non-restricting position upon the exertion of an operating force on the trigger by a user which is substantially above a standard operating force for a period of time. This may be achieved by elastic deformation of the restricting element(s), the engaging element(s) or both. However, the aforementioned embodiment is provided as an example. Based on this teaching other ways of achieving a similar effect are also conceivable to a person skilled in the art. Again, the slider will remain functional after overriding the slider.

In an embodiment, the at least one engaging element is provided on an edge of the trigger, preferably on a side of the engine opposing the connecting means.

It is advantageous to arrange the engaging element on an edge, since it increases the ease by which the restricting element is able to reliably engage with the engaging element, as opposed to the possible other ways of embodying the engaging element, e.g. as a through-opening in the trigger. The provision of the engaging element on an edge opposing the connecting means, close to the top of the engine, allows the slider to be designed relatively compact.

In an embodiment, the slider is provided on a surface of the device opposing the connecting means.

The provision of the slider on such a surface, which may coincide with what may be referred to as "the top" of the engine, makes the slider less complex in construction and easier and more reliable to operate in combination with the trigger.

In an embodiment, the pump comprises a pump chamber adapted to be brought into fluid communication with the container and a piston arranged in the pump chamber, mechanically connected or connectable to the trigger, and the engine comprises an outlet channel, fluidly connecting the pump chamber to the nozzle.

Such a pump, also known as a piston pump, is relatively easy in construction and use compared to other types of pumps.

In an embodiment, the pump has a suction side, adapted to be brought into fluid communication with the container, and a pressure side, adapted to be brought into fluid communication with the outlet channel, and wherein the device further comprises a pre-compression valve, arranged in the outlet channel, and a buffer in fluid communication with the outlet channel.

Such a pump is also referred to as a pre-compression force pump. With such a pump, it is possible to withdraw liquid from the container at the suction side of the pump, and to build up pressure in the dispensing device upstream of the pre-compression valve at the pressure side of the pump using the buffer, up to the moment at which the pressure reaches a cracking pressure of the pre-compression valve, at which moment the liquid in the pump is able to pass the pre-compression valve, causing the liquid to be dispensed through the nozzle.

The pump typically comprises an inlet valve at the suction side, allowing liquid to enter the pump chamber when the active volume of the pump chamber is increased, and which is closed or at least substantially closed by the pressure exerted on it during a reduction of the active volume of the pump chamber. Furthermore, the pump typically comprises outlet valve, for closing or at least substantially closing the connection to the outlet channel when the active volume of the pump chamber is increased, and which is opened by the pressure exerted on it, during a reduction of the active volume of the pump chamber.

The buffer may for instance be embodied as a gas buffer or as a buffer comprising a spring-loaded plunger.

In an embodiment, the pre-compression valve comprises a dome valve.

A dome valve comprises a diaphragm, which is elastically deformable between a closed and an open position at the cracking pressure. In the open position, liquid is able to pass the dome valve, whereas in the closed position, liquid is kept from passing the valve. Dome valves are relatively easy in construction with respect to other types of valves. For instance, they have a limited number of parts compared to other types of valves.

In another embodiment, the pre-compression valve is adjacent to the nozzle.

By arranging the pre-compression valve adjacent to the nozzle, any channel running between the pre-compression valve and the nozzle, is kept as short as possible, if present at all. This allows the rest of the volume to be used for other parts of the engine, allowing the device to have a relatively compact design.

In an embodiment, the pre-compression valve is oriented with its direction of valve movement between an opened and closed position in a direction substantially in line with an orifice in the nozzle.

This is opposed to the orientation as disclosed in WO 2018/202645 A1, in which the pre-compression valve is oriented with its direction of valve movement between an opened and closed position in a direction substantially perpendicular to the orifice in the nozzle. In the orientation according to the current embodiment, it is possible to reduce the length of the channel between the pre-compression valve and the nozzle, or to abstain from having such a channel altogether. This makes the design of the device more compact.

It should be noted that this embodiment and variants thereof may not be restricted to dispensing devices according to the invention as defined above, but may for similar reasons also be considered for dispensing devices according to the preamble of the description.

In an embodiment, the engine is composed of a first engine part, comprising the pump, and a second engine part, comprising the nozzle, the first and second engine part being mechanically connected or connectable to each other.

This provides the advantage of increased flexibility in the production of the dispensing device. The nozzle as part of the second part, and which may be used to restrict the movement of the trigger, as described in the foregoing, may only be connected to the first engine part after the arrangement of the trigger on the first engine part, increasing the ease of assembly.

In addition, separate first and second parts are easier in terms of manufacture compared to a one-part engine. Furthermore, engines composed of first and second parts can be shipped in a more compact way compared to one-part engines, reducing shipping costs. Additionally, engines composed of more than one part provide increased possibilities of product customization at a late stage of assembly. For instance, a first engine part comprising a standard pump may be combined with several different types of second engine parts, which may e.g. have nozzles oriented in different directions.

The second engine part may comprise just one part, but may in turn also be composed of a plurality of subparts, connected or connectable to each other and/or the first engine part.

It is remarked that this embodiment and embodiments thereof may not be restricted to dispensing devices according to the invention, but may for similar reasons also be considered for dispensing devices according to the preamble.

In an embodiment, the second engine part comprises at least one of the slider and the outlet channel.

In order to increase the aforementioned advantages of having an engine which is composed of a first and second part, it is preferred to design the first engine part, which comprises the pump, otherwise in a relatively basic way, in particular to reduce its costs of shipping. For that reason, it is preferred to accommodate many other parts of the engine in the second engine part. For that same reason, if the engine comprises a pre-compression valve, the second engine part preferably comprises the pre-compression valve.

In an embodiment, the device further comprises a guiding means, for guiding the movement of the slider.

In order to have the slider move in a controlled way, it is preferred to have a guiding means, for guiding the movement of the slider. Such a guiding means may for instance be provided by the trigger, which may have a channel running through it, in which the slider is accommodated.

In an embodiment, the slider is provided with a leg on a side opposing the restricting element, and wherein the guiding means comprises at least one slot, configured for receiving a free end of the slider.

In addition or as an alternative to any other guiding means, the slider may also be guided in a slot by a free end of the slider which is arranged on a side opposing the restricting element.

The slot may be open on one side, allowing the leg to be removed from the slot. The slot may for instance be C-shaped, with the open side of the slot directed outwardly. This slot may be provided with a latch preventing the leg from being removed from the slot. However, one of the latch and the leg may have a resiliency allowing the leg to be removed from the slot, despite the possible presence of a latch.

In an embodiment, the trigger comprises biasing means, connected or connectable to the engine, for urging the trigger towards the first position, said biasing means comprising at least one resilient arm, wherein a free end of the at least one resilient arm is provided with a downwardly directed tooth, for engaging or engaged in a pocket in the engine.

The provision of a tooth at a free end of at least one resilient arm of the biasing means which is downwardly directed, i.e. directed towards the connecting means, allows the pocket in the engine to have a shape which is relatively easier to produce, compared to the recess according to WO 2013/043938 A2, which is needed to engage with the protrusion disclosed in that publication. Moreover, by connecting the trigger to the engine through the biasing means, the engine and the trigger constitute a unit which is easy to handle and which may be transported or stored as such, i.e. without any external covering.

It is remarked that this embodiment and embodiments thereof may not be restricted to dispensing devices according to the invention, but may for similar reasons also be considered for dispensing devices according to the preamble of the description.

In an embodiment, the dispensing device comprises a shroud, for at least partially covering the slider, which shroud is further provided with means for accessing the slider through the shroud.

Such a shroud may be employed to prevent a user from accessing parts of the dispensing device which are not necessary to have access to during normal operation of the dispensing device. Such a shroud may additionally or alternatively be employed in order to give the dispensing device a certain decorative appearance.

When providing the device with such a shroud, it is highly preferred that the slider is still operable for a user. For this purpose, the shroud is, in this embodiment, provided with means for accessing (i.e. operating) the slider through the shroud. Such means may comprise a protruding part, which protrudes through an opening in the shroud. Alternatively, the shroud may be elastically deformable in a zone around the slider, making it possible to actuate the slider by deformation of the zone.

The shroud may be composed of a plurality of parts, such as a main part with an open top, which may be substantially cylindrical, and a cover part, for covering the open top in the main part. The shroud may fit to other parts, such as the trigger, in particular in its first neutral position.

In an embodiment, the shroud comprises an actuator operable from the exterior of the shroud, configured for moving the slider between the restricting and non-restricting position.

It is preferred to keep any means for accessing the slider through the shroud as small as possible, in order to reduce the chance of ingress of contaminants. In the current embodiment, the dispensing device is provided with an actuator, such as a button, configured for actuating the slider, allowing the slider to be hidden from view for an end user to a large extent. Consequently, the slider is no longer actuated directly by a user, but indirectly.

In an embodiment, the actuator comprises a toggle, slideable within a recess in the shroud.

Since the slider is slideable between the restricting and non-restricting position, the indirect operation of this slider through the shroud may have a particularly simple construction when the actuator is a toggle which is slideable as well, preferably in a direction parallel to the direction in which the slider slides between its restricting and non-restricting position. When the slider is arranged at the top of the engine, the recess may be formed in a top part of the shroud. This allows the toggle to be operated in an easy manner, e.g. by a user's thumb.

The provision of the toggle within a recess limits the extent in which the toggle protrudes from the shroud, thereby reducing the chance of damage to the toggle. The toggle may have a surface shaped for receiving the free end of a human finger, allowing the toggle to be actuated conveniently.

The presence of a toggle typically requires the presence of a slit through the shroud, for the toggle to be able to engage with the slider.

In an embodiment, the toggle is bound by the upper edge of the recess.

In order to further reduce the chance of ingress of contaminants, the toggle is preferably dimensioned such that is bound by the upper edge of the recess or, in other words, abuts against the edge of the recess.

In an embodiment, the actuator is arranged for moving the slider between the restricting and non-restricting position by a hooking part provided on one of the slider and the actuator, cooperating with a cavity provided in the other of the slider and the actuator.

The provision of such a hooking part on one of the slider and the actuator and a cavity in the other of the slider, provides for a more reliable connection between these parts in a relatively simple way. When the hooking part is provided on the slider, the hooking part is preferably inwardly directed.

In an embodiment, at least one of the slider and the trigger is reflection symmetrical with respect to a plane of symmetry through the nozzle.

A slider and/or trigger which is reflection symmetrical with respect to a plane of symmetry through the nozzle ensures an equal distribution of forces exerted on the device. The plane of symmetry concerned is typically parallel to the longitudinal direction of the engine.

In an embodiment, the trigger is hingeably connected to the engine for movement between its first and second position.

While other ways of moving the trigger are also conceivable, the movement of the trigger between the first and second position for actuation of the engine may have reliable and simple construction when the trigger hinges between its first and second position.

In an embodiment, the slider is configured for restricting the movement of the trigger from the first position to the second position.

In this case, the slider will keep the trigger in the first position. Preferably, this position is a neutral position. When the trigger is spring-loaded to be urged towards the neutral position, is not recommended to restrict the trigger in a non-neutral position, since this may cause damage and malfunction of the trigger.

In an embodiment, the range of movement of the trigger and the dimensions of the slider are such that the slider is moveable from the non-restricting position to the restricting position in just one of the first and the second position of the trigger.

By limiting the possible positions in which the slider is able to slide from a non-restricting position to a restricting position, the use of the slider will become more intuitive. Preferably, the first position is a neutral position, and the second position a depressed position. In this case, the possibility of restricting the trigger in a disadvantageous position is further reduced.

The invention further relates to a system for dispensing a liquid, comprising a container that is at least partially filled with the liquid, and a dispensing device according to any one of the preceding claims, connected to the container.

The dispensing device can be used to withdraw liquid from the container, and dispense the withdrawn liquid through the nozzle of the device.

In an embodiment, the container is a bag-in-bottle container.

With a bag-in-bottle container, like a Flair® container, it is not necessary to vent the container. The bag of such a bag-in-bottle container will progressively shrink around the inlet of the device, as it is being emptied.

The invention further relates to a method for the assembly of a device for dispensing a liquid, the method comprising the steps of:

providing a first engine part, comprising a pump;

providing a trigger;

connecting the trigger to the first engine part, for moving between a first position and a second position, for actuating the pump when brought from the first to the second position;

providing a second engine part, comprising a nozzle and preferably at least a slider with at least one restricting element; and connecting the second engine part to the first engine part after the step of connecting the trigger to the first engine part, preferably arranging the slider to be slideable between a non-restricting position, in which the trigger is moveable between the first and second position, and a restricting position, in which the restricting element restricts the movement of the trigger between the first and the second position with respect to the non-restricting position.

As mentioned, an engine which is composed of a first engine part, comprising a pump, and a second engine part, comprising at least a nozzle, and preferably at lease a slider with a restricting element, and more preferably also an outlet channel and a pre-compression valve, the trigger may be connected to the first engine part before connecting the second engine part to the first engine part. This still makes it possible to restrict the range of movement of the trigger with the nozzle, while not requiring the trigger to pass the nozzle during assembly.

In an embodiment, the step of providing a second engine part comprises the step of selecting the second engine part from several different types of second engine parts.

This provides flexibility in product differentiation in a late stage of assembly. For instance, the several different types of second engine parts may e.g. have nozzles oriented in different directions.

The invention will now be illustrated by way of an example, with reference being made to the annexed drawings, in which.

Figure 1:
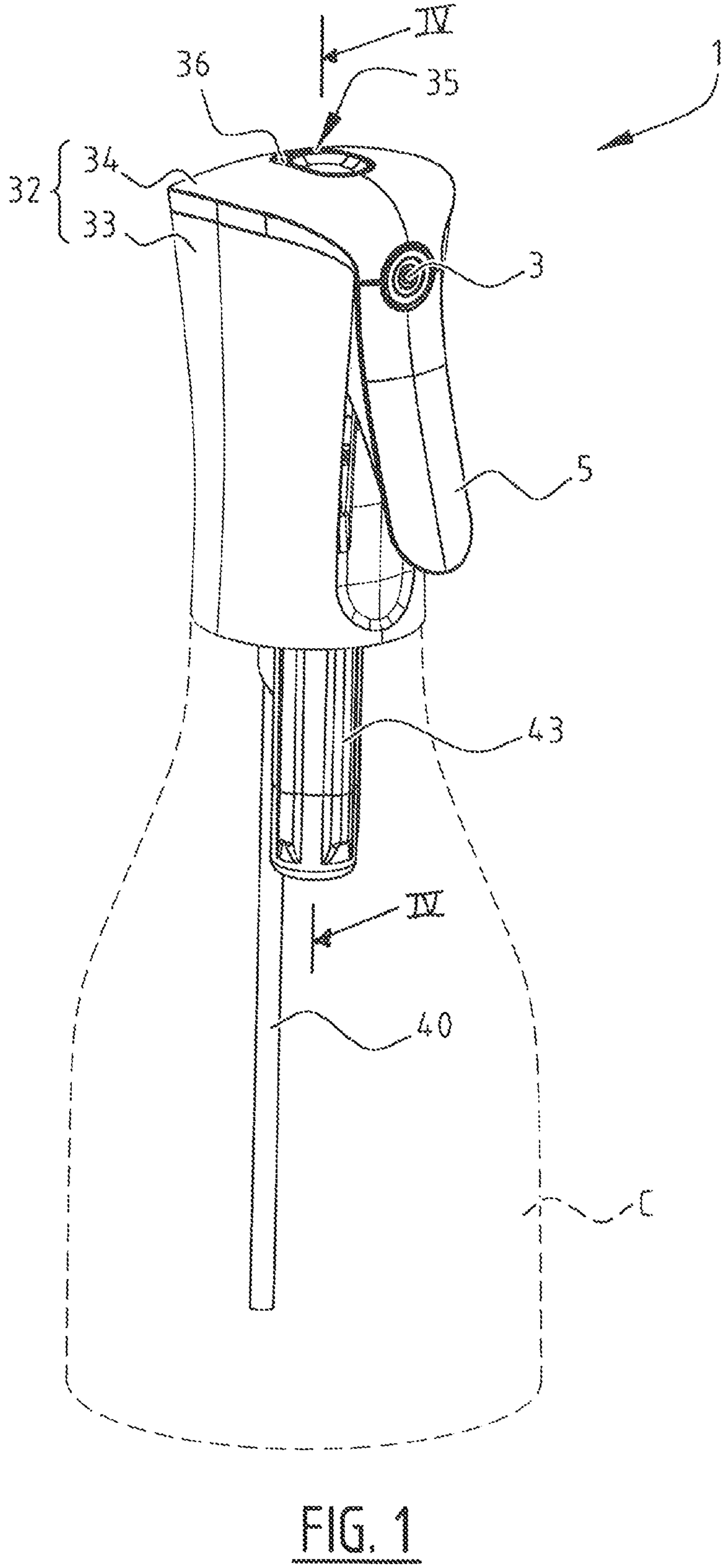
FIG. 1 is a front perspective view of a dispensing device of the invention, with the toggle in the non-restricting position and the trigger in a first neutral position, and with a possible container connected to it indicated in phantom.
Figure 2:
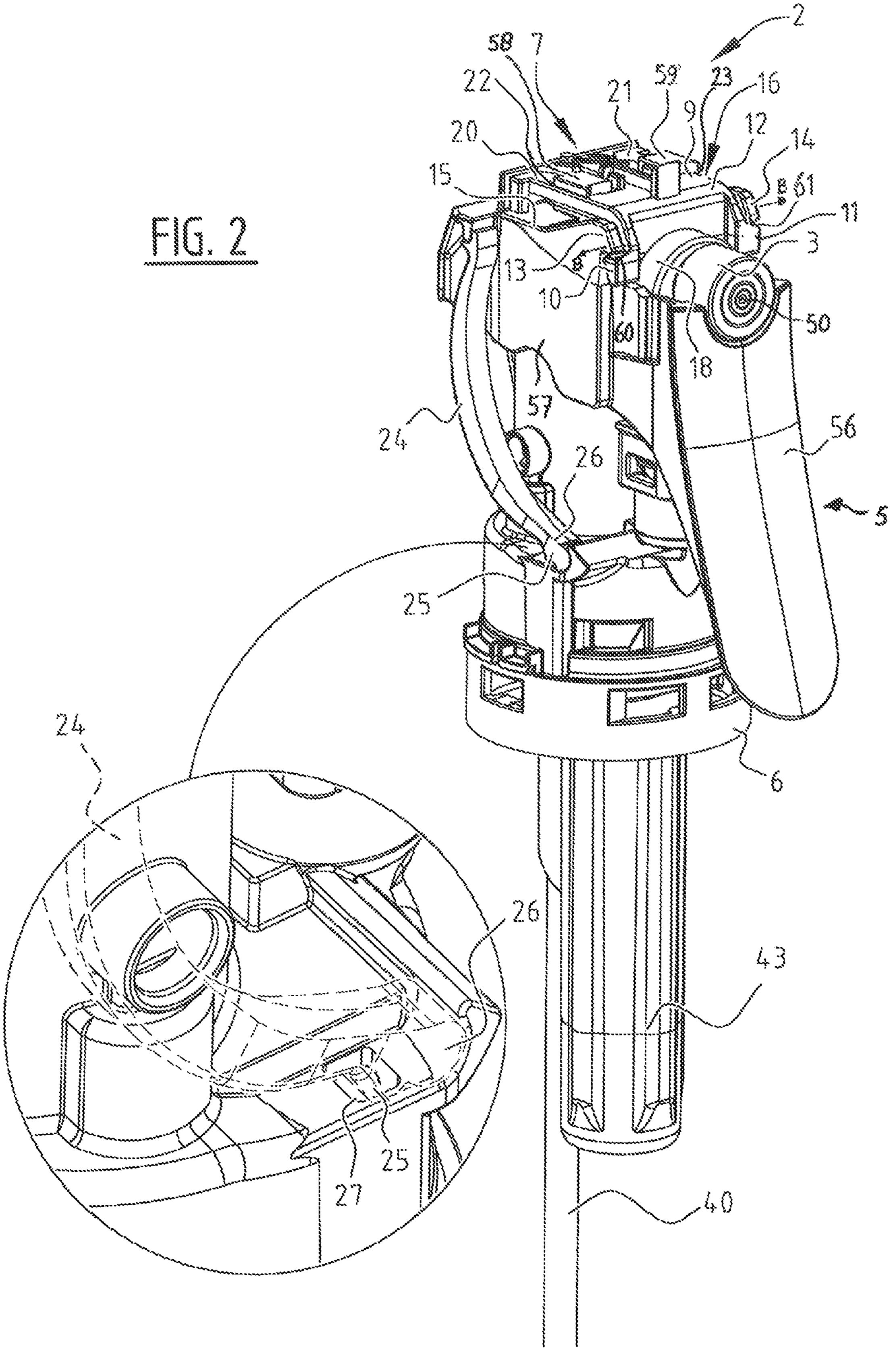
FIG. 2 is a front perspective view of the dispensing device of FIG. 1, with the slider in the restricting position, the trigger in the first neutral position and the shroud removed to show the engine, and a detailed rear perspective view at an enlarged scale of the connection of the resilient arm of the trigger (shown in phantom) to the engine.

A device 1 for dispensing a liquid (not shown) from a container C (shown in phantom in FIG. 1), such as a bag-in-bottle container, comprises an engine 2 (FIG. 2), a trigger 5, and connecting means 6, for connecting the engine 2 to a neck part of the container C. The connecting means 6 may be configured to establish a bayonet connection, a screw connection or a snap connection with the container C. The engine 2 comprises a nozzle 3 and a pump 4 for transferring the liquid from the container C to the nozzle 3. The trigger 5 is moveable between a first neutral position and a second at least substantially depressed position, and is connected to the pump 4 for actuating the pump 4 when brought from the first to the second position. In the illustrated embodiment the trigger 5 includes a handling part 56 which is connected to two wings 57 extending on opposite sides of the engine 2. Each wing 57 in turn is connected to a resilient arm 24 to be discussed below. Movement of the trigger 5 between the first and second positions in this case is a pivoting movement about a hinge axis 17, as illustrated by arrow T1.

At its top 7, opposite to the connecting means 6, the engine 2 of the device 1 is provided with a slider 9, with two restricting elements or projections 10, 11, which are connected to free ends of legs of a a U-shaped end 12 of the slider 9. These projections 10, 11 are arranged on opposite sides with respect to nozzle 3, and are directed inside out, as seen from the center of the engine 2.

The trigger 5 is provided with engaging elements 13, 14 on upper edges 15, 16 opposing the connecting means 6, near the top 7, which extend radially with respect to the hinge axis 17 (FIG. 5A, 5B) of the trigger 5.

Figure 5A:
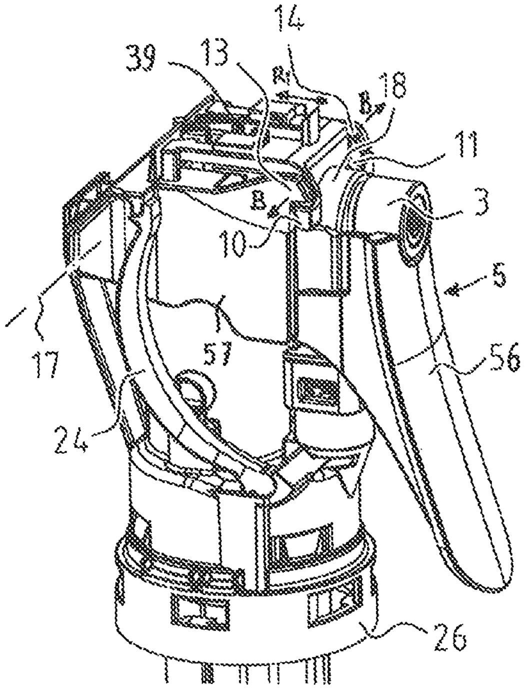
FIGS. 5A and 5B are perspective views of the device of FIG. 1 with the slider in a restricting and non-restricting position, respectively, and the shroud removed to show the engine, and with the trigger shown in phantom in FIG. 5B.

The slider 9 is slideable in the direction of arrow R1 between a non-restricting position, in which the trigger 5 is moveable from the first position to the second position and vice versa (FIG. 1, FIG. 5B, FIG. 7), and a restricting position (FIG. 2, FIG. 4, FIG. 5A, FIG. 6). The sliding movement of the slider 9 is in a direction which is substantially parallel to the direction of movement of the trigger 5 between its first and second positions—although the slider 9 moves in a linear way, as opposed to the pivoting movement of the trigger 5. The restricting elements 10, 11 are arranged at a position adjacent to the position of the engaging elements 13, 14 in the first or neutral position. In the restricting position, the restricting elements 10, 11 restrict the movement of the trigger 5 between from the first to the second position, by extending in a path T2 of the engaging elements 13, 14 between the first and second position of the trigger 5. In the non-restricting position, the restricting elements 10', 11' do not extend in this path T2, allowing the trigger 5 to move between its first and second positions for actuating the pump 4. In the latter position, a portion of the engine 2, namely a valve chamber 18 accommodating a pre-compression valve 19 (FIG. 4), is nested in the U-shaped end 12 of the slider 9, while the restricting elements 10, 11 are arranged around this engine portion (FIG. 5A, 5B).

In order to guide the movement of the slider 9, the slider 9 is bound by the upper edges 15, 16 of the trigger. Furthermore, the slider 9 is provided with two legs 20, 21 on the side of the slider 9 opposite the restricting elements 10, 11. These legs 20, 21 are slidably received in C-shaped outwardly directed slots 22, 23 formed in guide elements 58, 59 at the top 7 of the engine 2.

Figure 5B:
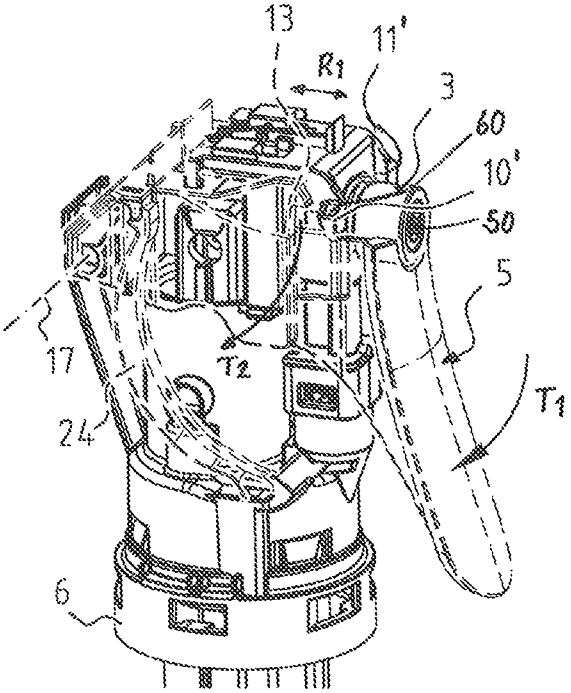
Figure 6:
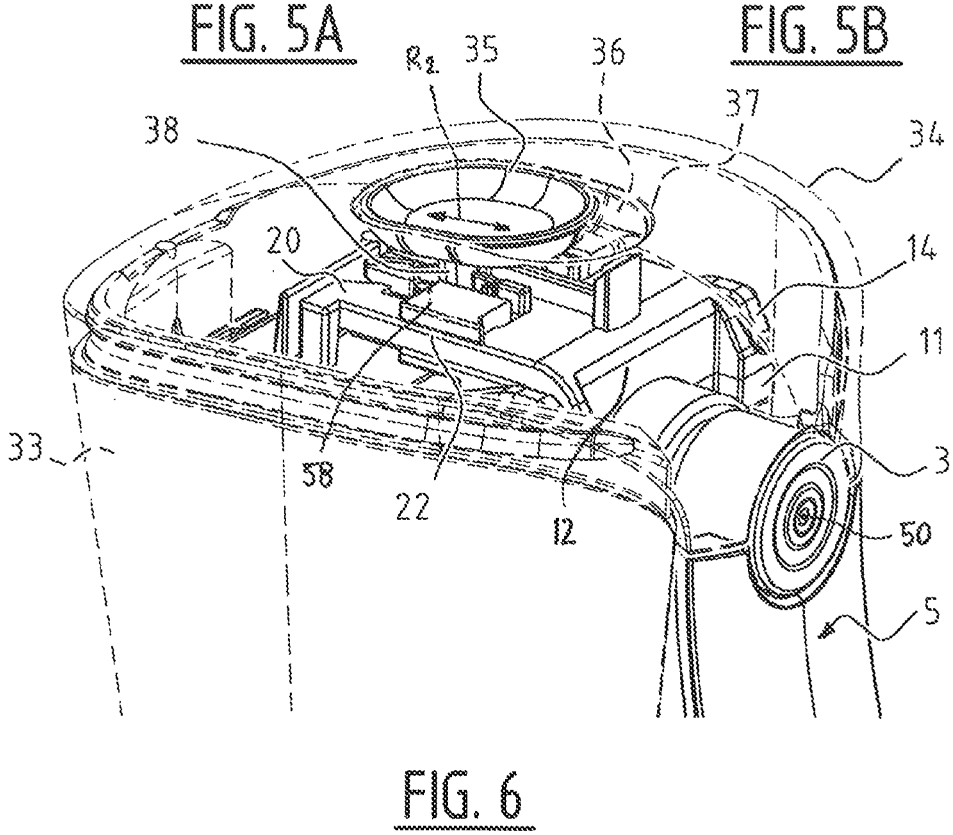
FIG. 6 is a perspective top view of the dispensing device, with the toggle in the restricting position and the shroud shown in phantom.

As can be identified from FIGS. 5A and 5B, both the projections 10, 11 and the protrusions 13, 14 have sloping surfaces facing each other. In this case, the projections 10, 11 each have a sloping upper surface 60, 61 facing the protrusions 13, 14, and the protrusions 13, 14 each have a sloping surface on a side facing towards the trigger 5. These sloping surfaces allow the trigger 5 to move between its first and second position even when the slider 9 is in its restricting position, namely upon the exertion of an operating force on the trigger 5 which is substantially above a standard operating force for a period of time. This may occur e.g. when a user persistently tries to force the trigger 5 from its first position to its second position with the slider 9 in its restricting position. In that case the protrusions 13, 14 move downwards on the sloping upper surfaces 60, 61 of the projections 10, 11, causing upper parts of the wings 57 carrying the protrusions 13, 14 to be elastically deformed and to bend outwards in the direction of arrow B. Once the protrusions 13, 14 have passed the projections 10, 11 they return to their original positions. By allowing the protrusions 13, 14 to ride over the sloping surfaces 60, 61 of the projections 10, 11, damage to the trigger 5 and or the slider 9 may be prevented. In that respect it should be noted that the purpose of restricting movement of the trigger 5 is merely to prevent inadvertent actuation when e.g. the dispensing device is carried in a user's bag or pocket, which will not normally involve any significant loads.

In order to urge the trigger 5 towards its first position, the trigger 5 is provided with biasing means. In this embodiment the biasing means comprise a pair of resilient arms 24 arranged on opposite sides of the trigger 5—of which only one is visible here. In the illustrated embodiment a tooth 25 is provided on a free end 26 of each arm 24. This tooth 25 is downwardly directed, and is engaged in pocket 27 in the engine 2 (shown in detail in FIG. 2). In this way the trigger 5 is securely connected to the engine 2.

Figure 3:
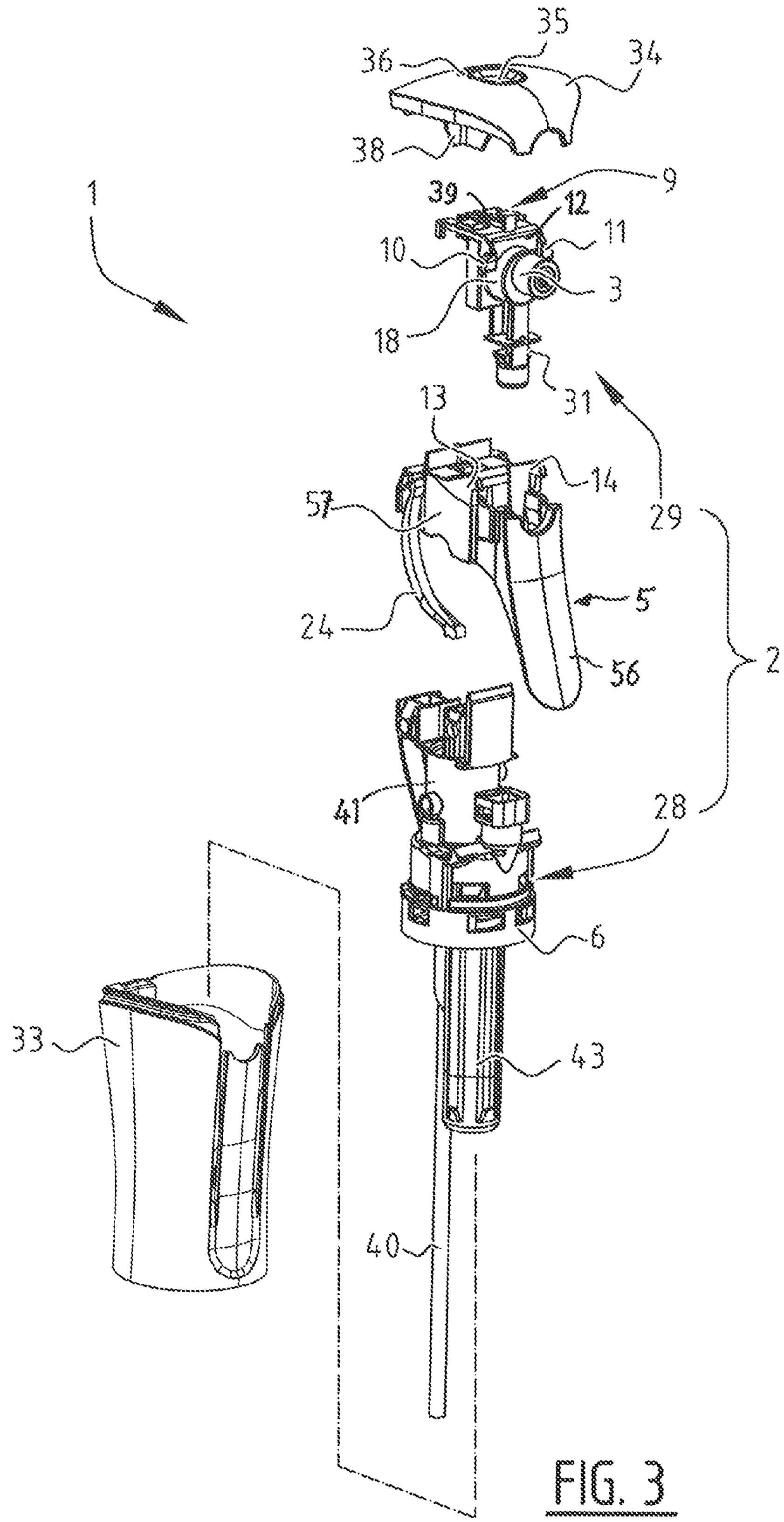
FIG. 3 is an exploded perspective view of the dispensing device of FIG. 1.
Figure 4:
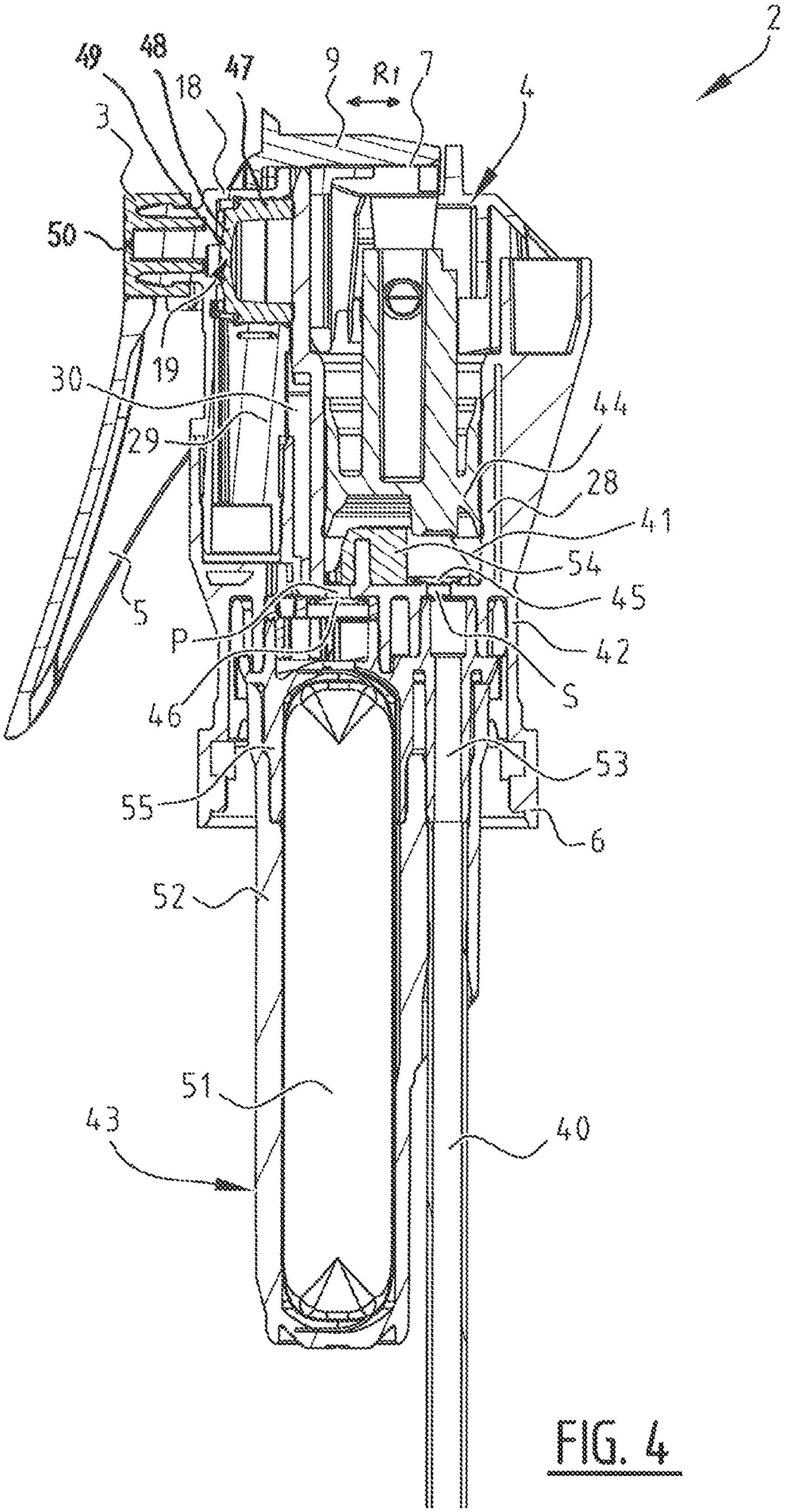
FIG. 4 is a longitudinal sectional view of the dispensing device along the line IV-IV in FIG. 1, with the slider in the restricting position, the trigger in the first neutral position and the shroud removed.

As can be identified from FIG. 3, in the illustrated embodiment the engine 2 is composed of a first engine part 28, comprising the pump 4, and a second engine part 29, comprising the nozzle 3, the slider 9, an outlet channel 30, and a connector 31 for connecting to the first engine part 28. By dividing the engine 2 into a first engine part 28 and a second engine part 29, it is possible to mount the trigger 5 on the first engine part 28, without having to pass the nozzle 3, while still allowing the nozzle to restrict the range of movement of the trigger 5. Consequently, such a device 1 may be assembled by first providing the first engine part 28 and the trigger 5, and by connecting the trigger 5 to the first engine part 28, such that it is able to move between the first position and the second position, for actuating the pump when brought from the first to the second position. Subsequently the second engine part 29 is provided and this second engine part 29 is connected to the first engine part 28 only after connecting the trigger 5 to the first engine part 28 (FIG. 3). The assembly method further comprises the step of arranging the slider 9 to be slidable between the non-restricting position and the restricting position.

In order to cover the engine 2 and the slider 9 arranged on the engine 2, the device 1 is provided with a shroud 32, which is composed of a main shroud part 33 and a cover shroud part 34 The cover shroud part 34 closes off an open top in the main shroud part 33, and fits to the trigger 5 in its first position. Both the cover shroud part 34 and the trigger 5 are provided with a semi-circular recess which together form a circle fitting around the circular nozzle 3.

In order for the slider 9 to remain accessible, the cover shroud part 34 is provided with an actuator in the form of a toggle 35, which is slidable back and forth in the direction of the arrow R2. This toggle 35 has a surface shaped for engagingly receiving a user's finger. The toggle 35 is accommodated in a recess 36 in the cover shroud part 34, and is bound by an upper edge 37 of the recess 36. The toggle 35 is provided with a hooking part 38, which is engaged in a cavity 39 in the slider 9. Since the toggle 35 is arranged in the cover shroud part 34 at the top of the device 1, it is easy to operate, e.g. by a user's thumb.

The pump 4 of the engine 2 has a suction side S that is adapted to be brought in fluid communication with the container C via an inlet channel 53. In the illustrated embodiment a dip tube 40 extending into the container C is connected to the inlet channel 53. The pump 4 also has a pressure side P that is in fluid communication with the nozzle 3 via outlet channel 30.

In the illustrated embodiment the pre-compression valve 19 in the outlet channel 30 is arranged in a horizontal orientation, i.e. its direction of valve movement between an opened and closed position is substantially in line with a dispensing orifice 50 in the nozzle 3. In this embodiment, the pre-compression valve 19 is a dome valve, which is snugly fitted in the valve chamber 18. The dome valve includes a sleeve 47 and a resiliently flexible diaphragm 48 which sealingly engages a valve seat 49. The pre-compression valve 19 has a cracking pressure which defines a lower limit of the pressure at which the liquid is sprayed.

The pump 4 includes a pump chamber 41 which is integrally formed with a frame 42 that includes the connecting means 6. A piston 44 is arranged for a sliding reciprocating movement in the pump chamber 41. This piston 44 is mechanically connected to the trigger 5, for moving the piston 44 and the pump chamber 41 with respect to each other upon the actuation of the trigger 5.

A buffer 43, here embodied as a gas buffer, extends through the annular connecting means 6 into the neck part of the container C. The buffer 43 is in fluid communication with the outlet channel 30 and can be brought into fluid communication with the pump chamber 41. In this embodiment the buffer 43 includes a gas-filled body 51 arranged in a buffer chamber 52. The gas-filled body 51 is locked in the buffer chamber 52 by a top part 55. The buffer 43 serves to store liquid by compression of the gas-filled body 52 when the pump 4 provides more liquid to the outlet channel 30 than the nozzle 3 can dispense. In this way liquid pressure may be maintained even after the trigger 5 has stopped actuating the pump 41.

At the suction side S, the pump 4 is provided with an inlet valve 45 for opening the pump chamber 41 to the inlet channel 53 when an active volume of the pump chamber 41 is increased, i.e. when the piston 44 is moved away from a bottom 54 of the pump chamber 41. The inlet valve 45 is further configured for at least partially closing off the connection to the inlet channel 53 when the active volume of the pump chamber 41 is decreased.

At its pressure side P, the pump 4 is provided with an outlet valve 46 for opening the pump chamber 41 to the outlet channel 30 when the active volume of the pump chamber 41 is decreased, i.e. when the piston 44 is moved towards the bottom 54 of the pump chamber 41. The outlet valve 46 is further configured for at least partially closing off the connection to the outlet channel 30 when the active volume of the pump chamber 41 is increased.

Figure 7:
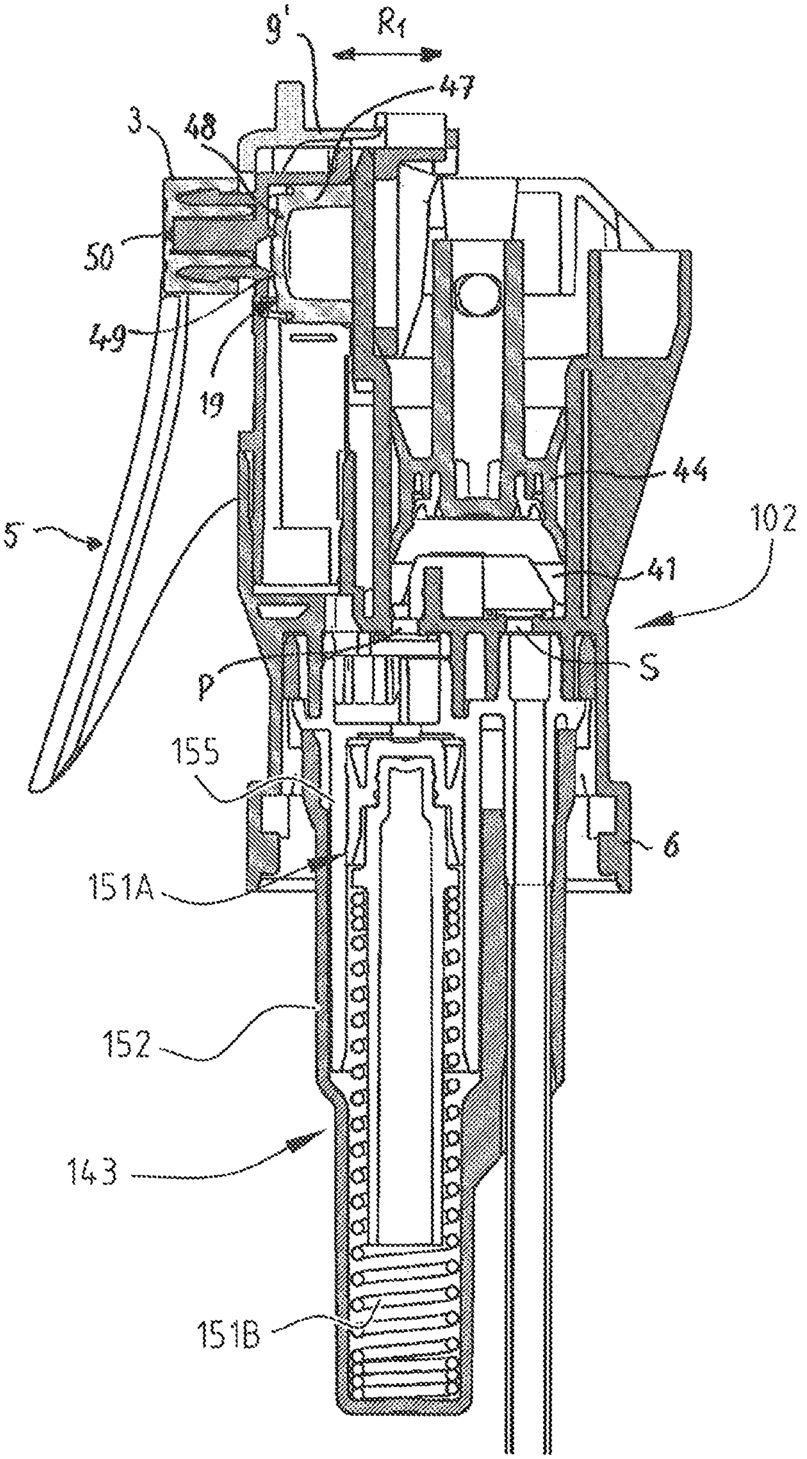
FIG. 7 is a longitudinal sectional view of a variant of the dispensing device according to FIG. 1 at the same position as in FIG. 4, with the slider in the non-restricting position, the trigger in the first neutral position and the shroud removed.

A variant 102 of the engine is shown in FIG. 7, of which only the differences with respect to the first embodiment are described in detail. All parts corresponding with those of FIG. 4 have been identified by identical reference numerals. It should be noted that the slider 9 is shown in its advanced non-restricting position. Instead of the gas buffer 43, the engine 102 is provided with a spring buffer 143, comprising a plunger 151A loaded by a spring 151B which are arranged in a buffer chamber 152. The spring-loaded plunger 151A is held in the buffer chamber 152 by a top part 155.

In this way the invention provides a liquid dispensing device that is easier to manufacture, store and transport than conventional devices of this type. Moreover, the liquid dispensing device of the invention is more compact than conventional devices.

Although the invention has been described here by way of some examples, it will be clear that it may be varied in many ways without departing from the scope of the following claims.

The invention claimed is:

1. A device for dispensing a liquid from a container, comprising:
- an engine comprising a nozzle and a pump for transferring liquid from the container to the nozzle;
- a trigger moveable between a first position and a second position, connected to the pump for actuating the pump when brought from the first to the second position,
- connecting means for connecting the engine to the container, and
- a slider with at least one restricting element, slideable between a non-restricting position in which the trigger is moveable between the first and second position, and a restricting position in which the at least one restricting element restricts the movement of the trigger between the first and the second position, wherein the slider is slideable in a direction which is substantially parallel to a longitudinal axis of an orifice in the nozzle,
- wherein the device is further provided with first and second restricting elements and first and second engaging elements, the first restricting element and first engaging element arranged on one side of the nozzle, and the second restricting element and second engaging element arranged on the opposite side of the nozzle.

2. The device according to claim 1, wherein the first and second engaging elements are arranged on the trigger and extend in a direction substantially perpendicular to the direction of the movement of the trigger between the first and the second position, and wherein the first and second restricting elements restricts the movement of the first and second engaging elements between the first and the second position with respect to the non-restricting position.

3. The device according to claim 2, wherein the first and second restricting elements each comprises a projection, and the first and second engaging elements each comprises a protrusion, wherein the projections and the protrusions are configured for engaging with each other in the restricting position.

4. The device according to claim 1, wherein at least one of the first and second restricting elements and the first and second engaging elements are sloping towards each other.

5. The device according to claim 1, wherein the slider is provided on a surface of the device opposing the connecting means.

6. The device according to claim 1, wherein the pump comprises a pump chamber adapted to be brought into fluid communication with the container, and a piston arranged in the pump chamber mechanically connected or connectable to the trigger, and wherein the engine comprises an outlet channel fluidly connecting the pump chamber to the nozzle.

7. The device according to claim 6, wherein the pump has a suction side adapted to be brought into fluid communication with the container, and a pressure side adapted to be brought into fluid communication with the outlet channel, and wherein the device further comprises a pre-compression valve arranged in the outlet channel, and a buffer in fluid connection with the outlet channel.

8. The device according to claim 7, wherein the pre-compression valve is oriented with its direction of valve movement between an opened and closed position in a direction substantially in line with an orifice in the nozzle.

9. The device according to claim 1, wherein the engine is composed of a first engine part comprising the pump, and a second engine part comprising the nozzle, the first and second engine part being mechanically connected or connectable to each other.

10. The device according to claim 9, wherein the second engine part comprises at least one of the slider and the outlet channel.

11. The device according to claim 1, further comprising a guiding means for guiding the movement of the slider.

12. The device according to claim 1, wherein the trigger comprises biasing means connected or connectable to the engine for urging the trigger towards the first position, said biasing means comprising at least one resilient arm, wherein a free end of the at least one resilient arm is provided with a downwardly directed tooth for engaging or engaged in a pocket in the engine.

13. The device according to claim 1, wherein the slider is configured for restricting the movement of the trigger from the first position to the second position.

14. The device according to claim 1, wherein the range of movement of the trigger and the dimensions of the slider are such that the slider is moveable from the non-restricting position to the restricting position in only one of the first and the second position of the trigger.

15. A system for dispensing a liquid, comprising a container that is at least partially filled with the liquid, and a dispensing device according to claim 1 connected to the container.

16. A device for dispensing a liquid from a container, comprising:

an engine comprising a nozzle and a pump for transferring liquid from the container to the nozzle;

a trigger moveable between a first position and a second position, connected to the pump for actuating the pump when brought from the first to the second position, connecting means for connecting the engine to the container, and a slider with at least one restricting element, slideable between a non-restricting position in which the trigger is moveable between the first and second position, and a restricting position in which the at least one restricting element restricts the movement of the trigger between the first and the second position, wherein the slider is slideable in a direction which is substantially parallel to a longitudinal axis of an orifice in the nozzle, wherein the dispensing device comprises a shroud for at least partially covering the slider, which shroud is further provided with means for accessing the slider through the shroud, wherein the shroud comprises an actuator operable from the exterior of the shroud configured for moving the slider between the restricting and non-restricting position, and wherein the actuator is arranged for moving the slider between the restricting and non-restricting position by a hooking part provided on one of the slider and the actuator, the hooking part cooperating with a cavity provided in the other of the slider and the actuator.

17. A device for dispensing a liquid from a container, comprising:

an engine comprising a nozzle and a pump for transferring liquid from the container to the nozzle;

a trigger moveable between a first position and a second position, connected to the pump for actuating the pump when brought from the first to the second position, connecting means for connecting the engine to the container, and a slider with at least one restricting element, slideable between a non-restricting position in which the trigger is moveable between the first and second position, and a restricting position in which the at least one restricting element restricts the movement of the trigger between the first and the second position, wherein the slider is slideable in a direction which is substantially parallel to a longitudinal axis of an orifice in the nozzle, wherein the trigger is hingeably connected to the engine for movement between its first and second position.

* * * * *